United States Patent Office 3,036,144
Patented May 22, 1962

1

3,036,144
SOLID BARRIER ELECTROLYTE INCORPORATING ADDITIVE
Kurt Lehovec and Donald M. Smyth, Williamstown, Mass., assignors to Sprague Electric Company, North Adams, Mass., a corporation of Massachusetts
No Drawing. Filed Apr. 20, 1959, Ser. No. 807,308
7 Claims. (Cl. 136—153)

This invention relates to barrier electrolytes for solid electrolyte battery cells, and more particularly relates to solid barrier electrolytes incorporating an additive for improving their conductivity.

The performance of solid electrolyte battery cells of the type described by Kurt Lehovec in U.S. Letters Patent 2,696,513 is sometimes generally improved by the incorporation of various additives within the solid barrier electrolyte layer. This layer is, for example, made of silver chloride. It is accordingly suggested in Patent 2,696,513 that a minor amount of cadmium chloride may be introduced within a silver chloride solid barrier electrolyte to increase the conductivity of the barrier layer thereby improving its operating characteristics. This cation doping has been found to be helpful over the entire operational temperature range.

An object of this invention is to provide a means for improving the operating characteristics of solid electrolyte battery cells over a wide temperature range.

In accordance with this invention, divalent anions selected from the sulfur family of the periodic system, particularly sulfur, selenium, and tellurium, are introduced in the form of their silver compounds into a solid barrier electrolyte such as silver chloride. Although this doping in minor amounts first produces adverse effects, increases in the amount introduced unexpectedly decrease the resistivity of this barrier electrolyte when amounts equal to and in excess of 0.1 mol percent are utilized. Above this 0.1 percent turning point, additional amounts of these divalent anions cause surprising linear decreases in resistivity with remarkably low resistivity obtained when as much as 6 mol percent of anion compound is added to the barrier electrolyte.

The preferred divalent anions for such addition to solid barrier electrolytes are divalent anions of the sulfur series, namely Te=, Se= and S=. Most commonly used solid barrier electrolytes at present are of the metallic halide type, and silver chloride is a representative barrier electrolyte of this type. These divalent anions are, accordingly, introduced in the form of respective silver compounds.

Several experiments have been conducted which prove that the conductivity of solid barrier electrolyte materials such as those made of silver chloride (AgCl) are substantially increased by the addition of anions of the sulfur series. These anions are, for example, introduced by the addition of compounds of these elements with silver, namely, for example, silver selenide $Ag_2Se$ or silver sulfide $Ag_2S$. Weighed amounts of $Ag_2Se$ or $Ag_2S$ (prepared by a previous reaction between these elements) were added to molten AgCl. The mass was then solidified and rolled to a thickness of from 0.005 to 0.010 inch, and silver electrodes were then painted on opposite sides of the resultant foil. The resistance across this foil was then measured, for example, by means of an A.C. bridge utilizing a 60 cycle signal. Both the sulfide and selenide additions produced the following identical results, and this discussion will, therefore, be expressed only in terms of the sulfide.

The addition of $Ag_2S$ up to 0.1 mole percent caused an increase in resistivity from 7–10 megohm cm. for undoped AgCl to 30–40 megohm cm. Further addition of sulfide caused a linear decrease in resistivity with values of 3 megohm cms., with 1 mole percent sulfide and 0.4–0.5 megohm cm. with 6 mole percent.

The increase of ionic conduction of solid barrier electrolyte by addition of these anions is not fully understood, but results in a lower internal resistance in the cells, making possible the delivery of larger currents.

What is claimed is:
1. A solid barrier electrolyte material consisting essentially of a major portion of a silver halide, and a minor addition of an amount of a compound of silver with a member of the sulfur family of the periodoic system ranging from above 0.1 mol percent through approximately 6 mol percent of said solid barrier electrolyte material, said amount being adapted to improve the operating characteristics of said solid barrier electrolyte material.
2. A solid barrier electrolyte as set forth in claim 1 wherein said silver halide is silver chloride.
3. A solid barrier electrolyte as set forth in claim 2 wherein said anion is the sulfur anion.
4. A solid barrier electrolyte as set forth in claim 2 wherein said anion is the selenium anion.
5. A solid barrier electrolyte material as set forth in claim 1 wherein said silver compound is silver selenide, $Ag_2Se$.
6. A solid barrier electrolyte material as set forth in claim 1 wherein said silver compound is silver sulfide, $Ag_2S$.
7. A solid barrier electrolyte material as set forth in claim 1 wherein said minor addition is present in the amount of approximately at least 6 mol percent.

References Cited in the file of this patent
UNITED STATES PATENTS

| | | |
|---|---|---|
| Re. 24,408 | Hack et al. | Dec. 17, 1957 |
| 2,696,513 | Lehovec | Dec. 7, 1954 |
| 2,930,830 | Lieb | Mar. 29, 1960 |

OTHER REFERENCES

Perry (Chemical Engineer's Handbook), third edition (1950), McGraw-Hill (N.Y.C.), (page 1732).

"Measurements on Galvanic Cells Involving Solid Electrolytes," technical report by Kinkkola and Wagner, Aug. 15, 1956.